Patented Aug. 24, 1943

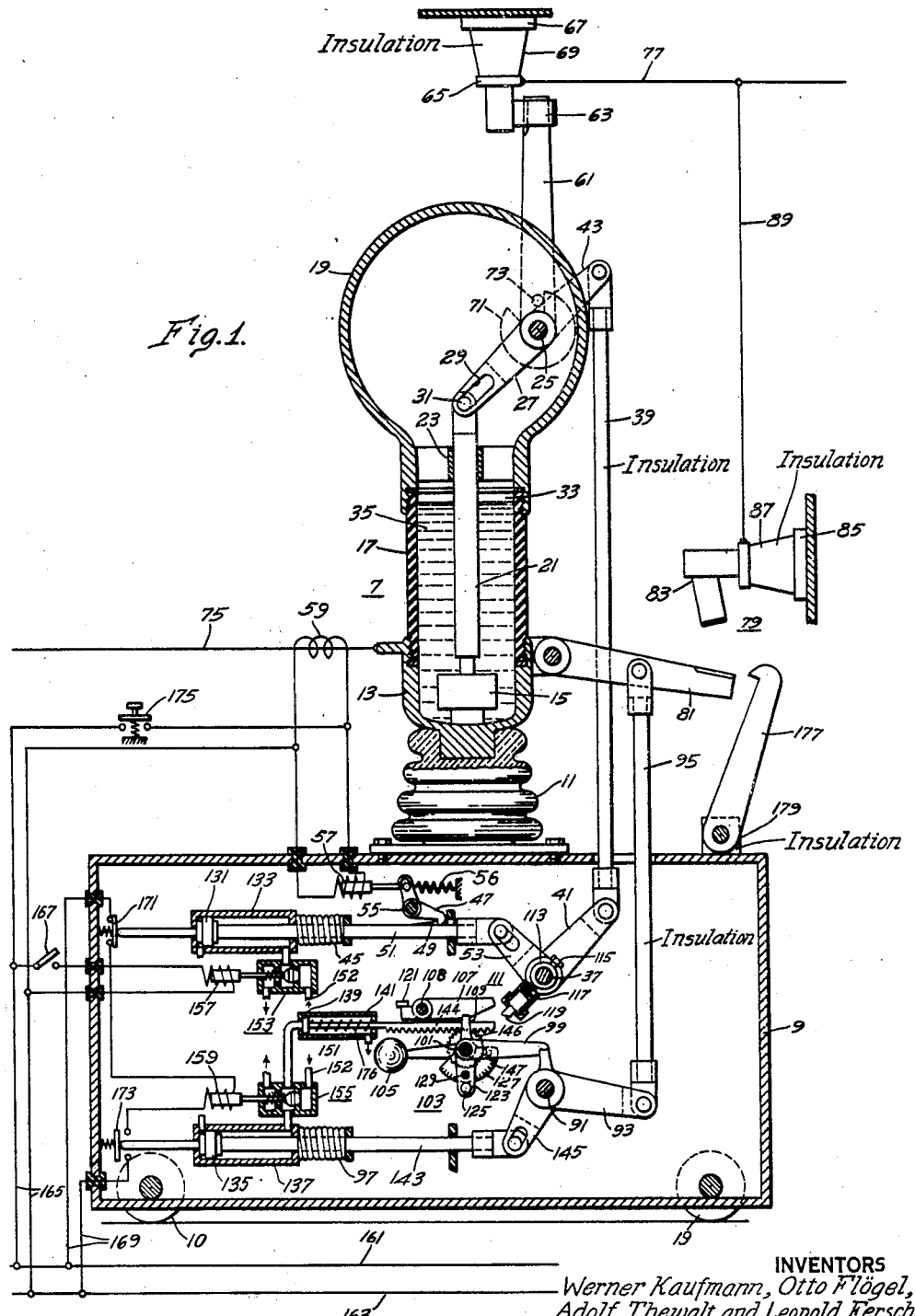

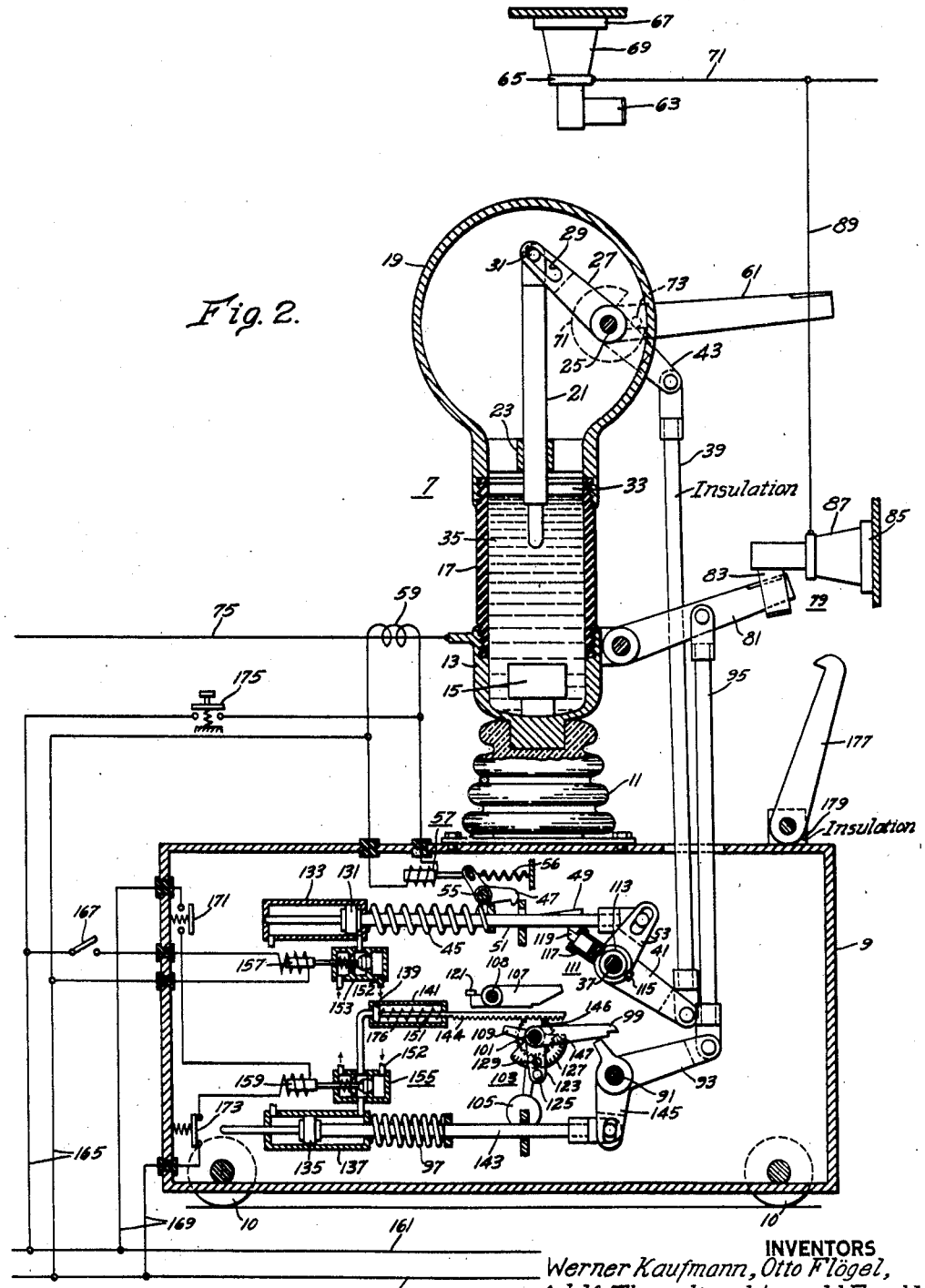

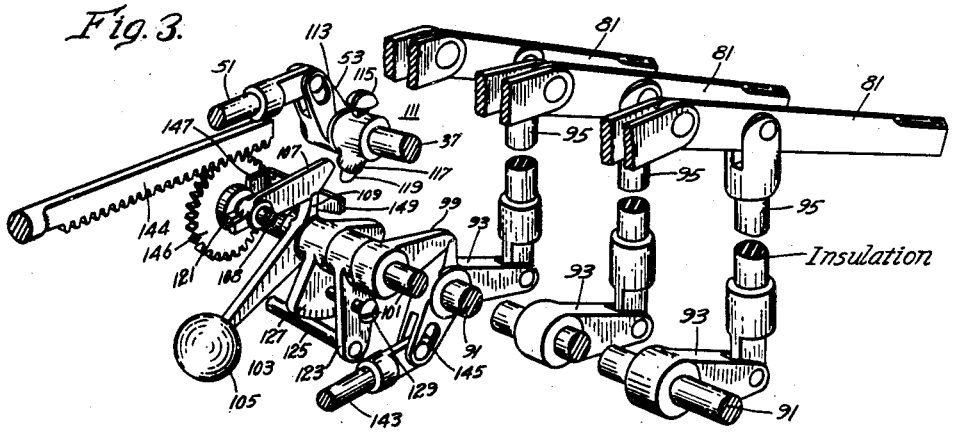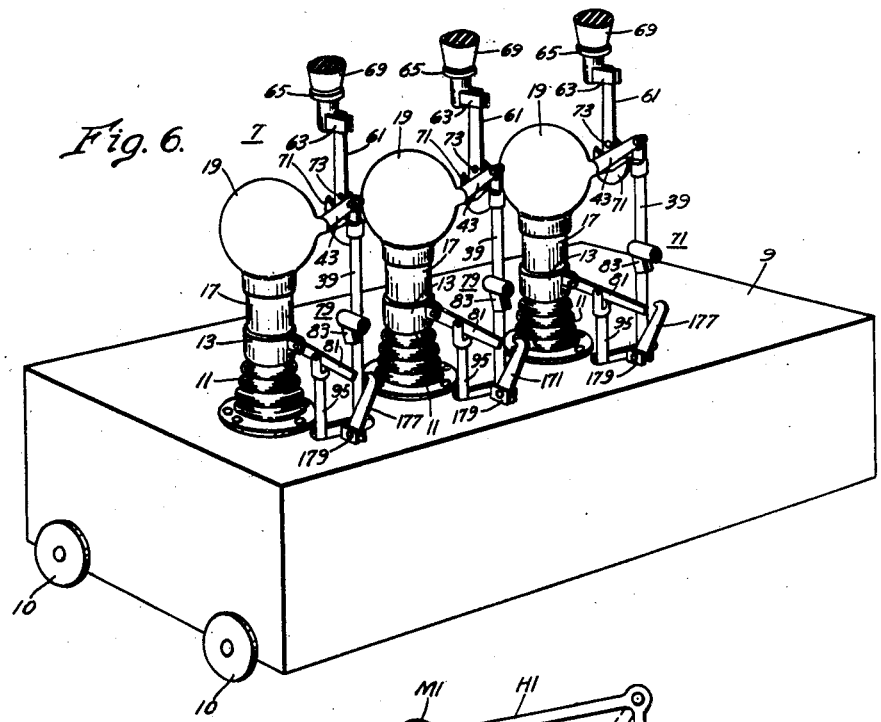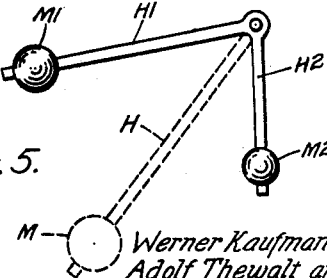

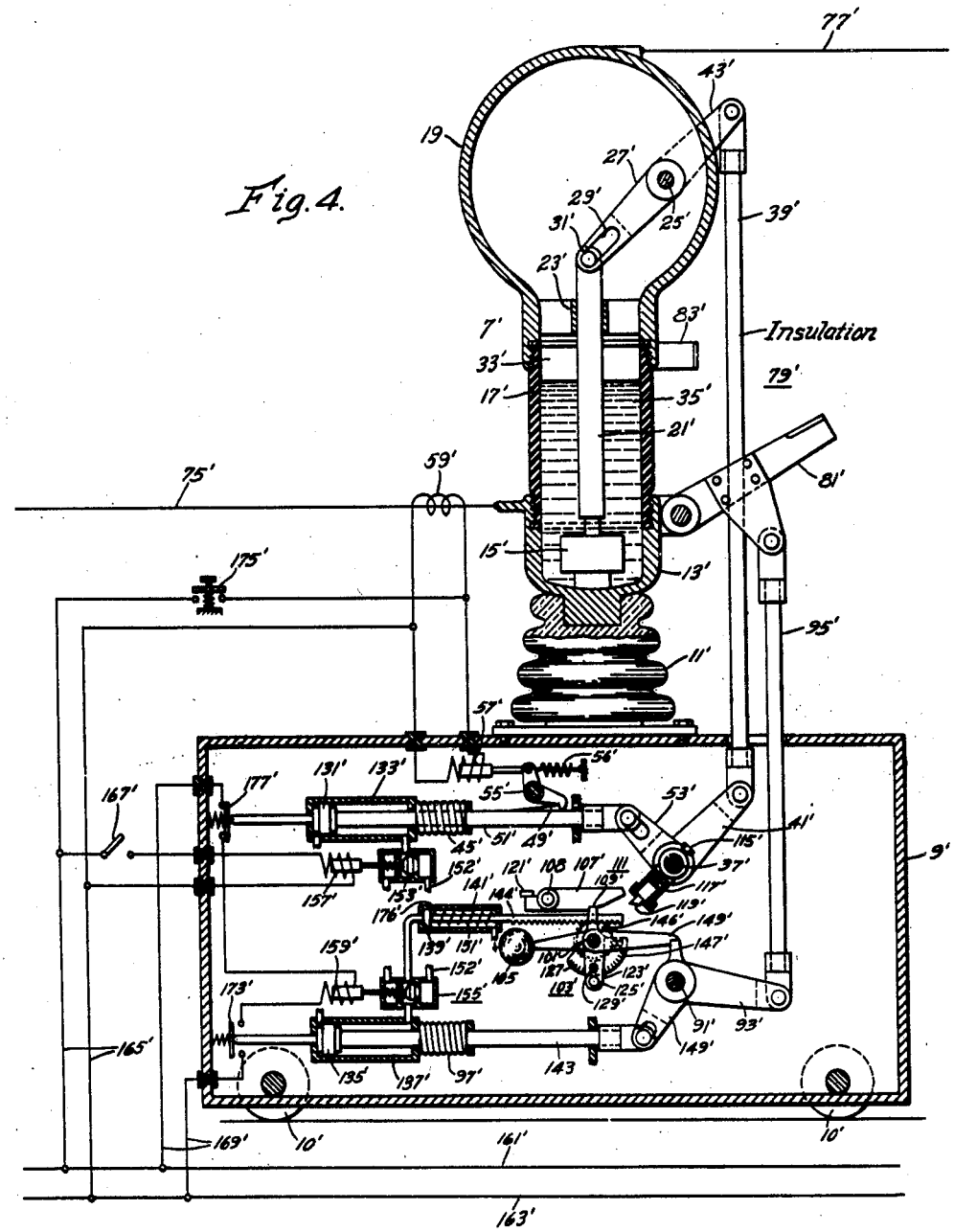

2,327,799

UNITED STATES PATENT OFFICE 2,327,799

CIRCUIT BREAKER

Werner Kaufmann, Berlin-Siemensstadt, Otto Flögel, Berlin, Adolf Thewalt, Berlin-Siemensstadt, and Leopold Ferschl, Berlin, Germany, assignors to Westinghouse Electric & Manufacturing Company, East Pittsburgh, Pa., a corporation of Pennsylvania Application November 15, 1940, Serial No. 365,824
In Germany August 25, 1939

21 Claims. (Cl. 200—89)

The invention relates to circuit interrupting apparatus and more particularly to high voltage circuit breakers for use in electrical transmission or distribution systems to open and automatically reclose the circuit.

The copending application of Werner Kaufmann, Serial No. 289,535, filed August 11, 1939, and assigned to the assignee of the present invention, now Patent No. 2,312,174, granted February 23, 1943, discloses a high voltage circuit breaker which operates to open and automatically reclose the circuit for the purpose of extinguishing short-circuit arcs arising in the circuit or network. The circuit is interrupted upon the occurrence of a short-circuit by a circuit interrupter, preferably an expansion breaker, and is thereafter reclosed by a separate pair of contacts, preferably a knife switch operating in air which is structurally associated with the circuit interrupter. The reclosing knife switch is coupled or interlocked with the circuit interrupter in such a way that the desired sequence of operation is maintained and the knife switch begins its closing operation as soon as the moving contact of the circuit interrupter arrives at the full open circuit position.

It has been found that the time between the opening of the circuit and reclosing of the circuit in such apparatus cannot be increased or otherwise varied a sufficient amount to meet particular requirements or circumstances.

Moreover, because of variable operating conditions, for example, variations in ambient temperature, certain undesired variations in the time interval between the opening and reclosing of the circuit occur. These variations are caused less by the different lengths of the interval during which the arc persists at the point of opening of the circuit than by the influence of the operating conditions on the speed of movement of the circuit interrupter element. The last-mentioned variations are undesirable and should be avoided.

The present invention constitutes a further development and improvement of the invention disclosed in the aforementioned copending application Serial No. 289,535.

An object of the present invention is the provision of an improved circuit breaker which is operable to interrupt the circuit at a set of circuit interrupting contacts and to automatically reclose the circuit at a separate set of contacts a predetermined and definite time interval after opening of the circuit interrupting contacts.

Another object of the invention is the provision of a circuit breaker of the class described in which means is provided for accurately predetermining the time interval between opening of the circuit at the interrupting contacts and reclosing of the circuit at the reclosing contacts.

Another object of the invention is the provision of a circuit breaker of the class described having a construction such that the predetermined time interval between opening and reclosing of the circuit is substantially independent of the magnitude of the power to be interrupted and of other variable operating conditions.

Another object of the invention is the provision of a circuit breaker as previously described in which the predetermined time interval between opening and reclosing of the circuit is substantially independent of the speed of movement of the contacts of the interrupter and is unaffected by variations in ambient temperature.

Another object of the invention is the provision of a circuit breaker as previously described in which the reclosing operation is initiated a predetermined time interval after the moving contact of the circuit interrupter has passed an intermediate point in its opening movement.

Another object of the invention is the provision of a circuit breaker as previously described which embodies an adjustable timing device for predetermining and selectively varying the time interval between opening and reclosing of the circuit.

Another object of the invention is the provision of an improved circuit breaker as previously described which is simple, accurate and reliable in operation, and inexpensive to manufacture.

In accordance with the invention the circuit breaker comprises a circuit interrupter, by means of which the circuit is interrupted, and a separate switch operating in air structurally associated with the interrupter for automatically reclosing the circuit a predetermined time interval after opening of the circuit by the interrupter. The contacts of the interrupter and of the reclosing switch are actuated by separate drives, and the drive for the switch, which is preferably of the spring type is released for closing by a timing device which is in turn set in operation by the circuit interrupter at a predetermined intermediate point in the opening movement of the interrupter contacts. The timing device is preferably of the falling weight or pendulum type and embodies an adjusting means whereby the time interval between opening and reclosing of the circuit may be preselected.

The novel features that are considered characteristic of the invention are set forth in particular in the appended claims. The invention itself, however, both as to structure and operation together with additional objects and advantages thereof will be best understood from the following detailed description of several embodiments of the invention when read in conjunction with the accompanying drawings in which:

Figure 1 is a sectional view of a circuit breaker or short-circuit extinguisher constructed in accordance with the invention, the control devices and circuits being shown schematically, and the breaker being shown in the normal closed circuit position;

Fig. 2 is a view similar to Fig. 1 showing the positions of the parts after the circuit has been interrupted by the circuit interrupter and reclosed by the associated air break switch;

Fig. 3 is a perspective view of the timing device and the movable parts of the switch;

Fig. 4 is a sectional view of a modified form of the circuit breaker, the control devices and the circuits being shown schematically, and the circuit breaker being shown in the normal closed circuit position;

Fig. 5 is an elevational view of a modified pendulum construction for the timing device; and Fig. 6 is a perspective view of the circuit breaker shown in Fig. 1.

The circuit breaker embodying the features of the invention is illustrated as being of the multipole type and comprises three pole units 7 mounted in spaced relation on a box-shaped metal housing 9 which houses the operating mechanism of the breaker. The base 9 is shown as being provided with wheels 10 whereby it may be rolled into and out of operative position. The several pole units are of identical construction and each is mounted on a supporting insulator 11 preferably of vitreous insulating material which is secured to the top of the base 9 and serves to insulate the pole unit from the metal base.

Each pole of the circuit breaker comprises a pair of enclosed circuit interrupting contacts by means of which the circuit is interrupted, and an associated pair of air break contacts by means of which the circuit is automatically reclosed a predetermined time interval after interruption of the circuit.

Referring to Figure 1 of the drawings, the circuit interrupting unit of each pole of the breaker comprises a cup-shaped terminal 13 of conducting material secured to the supporting insulator 11 and having a stationary contact 15 mounted centrally therein which forms the fixed contact of the circuit interrupter.

A tubular casing 17 of strong insulating material is mounted at its lower end on the cup-shaped terminal 13 and this tubular casing has a generally spherical hollow metal head 19 secured to its upper end. The tubular casing 17 is preferably secured to the terminal 13 and head 19 in a fluid-tight manner as for example, by having a screw-threaded engagement with the terminal and with the head.

A movable contact member 21 in the form of a bar or rod of conducting material is mounted for vertical movement in the casing 17 and hollow head 19, and is guided for vertical movement therein by a guide member 23 secured in the neck of the head 19.

A shaft 25 extends transversely through the hollow head 19 and is rotatably mounted in suitable bearings formed on the opposite sides of the head. A crank lever 27 is rigidly secured to the shaft 25 inside of the head and is connected at its free end to the upper end of the movable contact member 21 by means of a slot 29 which engages a pin 31 carried by the upper end by the movable contact member 21.

An arc extinguishing means of any suitable type may be provided within the interrupting chamber 33 for extinguishing the arc drawn between the contacts 21 and 15 during interruption of the circuit. The arc extinguishing means may be of any well known type, as, for example, a fluid 35, such as water or oil, contained within the chamber 33. If desired, the other known types of arc extinguishing structure, either of the fixed or expansion type, may be associated with the contact means of the interrupter.

The movable contact members 21 of the three poles of the circuit breaker are adapted to be simultaneously actuated to open or to closed circuit position by actuating means disposed in the housing 9, comprising a common actuating shaft 37 which is rotatably mounted in the housing 9. Each of the movable contact members 21 is mechanically connected to the shaft 37 for actuation thereby by means of an insulating rod 39 which extends through an opening provided in the top of the housing 9, the lower end of the insulating rod 39 being pivotally connected to an individual crank arm 41 rigidly secured to the shaft 37, and the upper end of the insulating rod being pivotally connected to a crank arm 43 secured to the shaft 25 of the circuit interrupter at a point outside of the head 19.

The movable contact members 21 are biased upwardly to open circuit position by means of accelerating or circuit opening springs 45 which act to rotate the shaft 37 in a clockwise or opening direction. The movable contact members 21 are normally held in closed circuit position against the opening force of the accelerating springs 45 by means of a latch 47 which normally engages a latch projection 49 on a resetting bar 51 which is connected to the actuating shaft 37 by a crank arm 53.

The latch 47 is carried by a trip bar 55 which is rotatably mounted in the housing 9. The trip bar 55 is biased to latching position by a tension spring 56 and is adapted to be actuated to tripped position by any one of three tripping solenoids 57 (only one being shown) which have their plungers pivotally connected to arms projecting from the trip bar 55, there being one tripping solenoid for each pole of the circuit breaker. Each tripping solenoid 57 is energized in response to the current flowing through its pole of the interrupter by means of a current transformer 59.

When a short circuit occurs in the circuit of any pole of the circuit breaker the tripping solenoid 57 of the affected pole rotates the trip bar 55 counterclockwise as viewed in Fig. 1 and thus effects release of the actuating shaft 37, causing simultaneous opening of the three movable contact members 21 by the accelerating spring 45. Under normal circuit conditions, however, the contact means of the circuit interrupters are held in closed circuit position as shown in Fig. 1 by the latch 47.

Each circuit interrupter may be provided with an auxiliary knife switch comprising a switch blade 61 rotatably mounted on the shaft 25 outside of the head 19, and a stationary contact jaw 63 carried by the terminal 65. The terminal 65 is mounted on a fixed support 67 above the head of the circuit interrupter and is insulated from the fixed support by an insulator 69. The switch blade 61 is coupled for movement with the movable contact member 21 by means of a lost motion connection comprising a notched disk 71 rigidly secured to the rotatable shaft 25 and a projecting pin 73 on the switch blade 61 which engages in the V-shaped notch of the disk 71, the lost motion connection between the movable contact 21 and the switch blade 61 being such that during a circuit opening operation the switch blade 61 is moved to open position after the movable contact 21 has opened a predetermined amount, and during a closing operation the switch blade 61 is moved to closed position immediately after the movable contact 21 has engaged the stationary contact 15. The auxiliary switch 61—63 provides a safe air gap in the circuit when the circuit breaker is permanently disconnected, that is, when all of the contacts and switches of the circuit breaker are in open position.

Each circuit interrupting device is electrically connected in one of the three main circuits controlled by the breaker, one of the three main circuits being represented by the lines 75—77. The line 75 is electrically connected to the lower terminal 13 of the circuit interrupter and the line 77 is electrically connected to the upper terminal 65. The lower terminal 13 is directly electrically connected to the stationary contact 15, and the switch blade 61 is electrically connected to the movable contact member 21 in any suitable manner, as, for example, through the shaft 25 and a flexible shunt conductor (not shown) to the movable contact member 21.

For reclosing the circuit following a circuit interruption, an additional pair of contacts or switching device is provided which comprises an air break switch indicated generally at 79 associated with the circuit interrupting unit. The air break switch 79 comprises a switch blade 81 which is pivotally mounted on the lower terminal 13 of the circuit interrupter, and a fixed jaw contact 83 which is mounted on a fixed support 85 and insulated therefrom by an insulator 87. The air break switch 79, by means of which the circuit is reclosed, is electrically connected in the circuit in parallel to the contacts of the interrupter and the auxiliary switch 61—63, the blade 81 of the switch being electrically connected to the terminal 13 and the stationary jaw contact 83 being electrically connected to the line 77 by means of a conductor 89.

A separate actuating means is provided for simultaneously actuating the air break switches 79. This actuating means comprises an actuating shaft 91 rotatably mounted in the housing 9 and mechanically connected to the three switch blades 81 by means of crank arms 93 secured to the shaft 91 and by insulating rods 95 which extend through suitable openings in the top of the housing 9. The upper ends of the insulating rods 95 are pivotally connected to the switch blades 81, and the lower ends of the rods are pivotally connected to their respective crank arms 93. The switch blades 81 are biased and actuated to closed position by means of an actuating spring 97 which acts to rotate the shaft 91 in a counterclockwise direction as viewed in Fig. 1, when the shaft is released.

The air break switches 79 are normally held in open position by means of a latch 99 rotatably mounted on a fixed shaft 101 in the housing 9.

The air break switches 79 are arranged to automatically reclose the circuit a predetermined interval of time after interruption of the circuit by the circuit interrupting devices 21.

It is important that the time interval between opening and reclosing of the circuit be made adjustable or variable in order that the device may be adapted to different operating conditions. It is also important that once the time interval has been set or predetermined it should remain substantially constant and unaffected by variations in the speed of movement of the circuit interrupting contacts and other operating conditions, for example, variations in ambient temperature. To meet these requirements of adjustability and accuracy of timing there is provided an adjustable timing device indicated generally at 103 which is set in operation at a predetermined point in the initial opening movement of the circuit interrupting contacts, and operates to effect a closing operation of the air break switches 79 a predetermined time interval after interruption of the circuit by the circuit interrupting devices.

Referring to Fig. 3, the timing device 103 comprises a pendulum 105 which is rotatably mounted for free swinging movement on the shaft 101 and which is normally held in a raised or elevated position as shown by means of a latch 107. The latch 107 is pivotally mounted at 109 and engages an arm 109 rigidly secured to the hub of the pendulum. The latch 107 is adapted to be released at a predetermined point in the opening movement of the circuit interrupting contacts 21, preferably at a point shortly after the contacts 21 separate from the stationary contacts 15. For this purpose a tripping element 111 is adjustably secured to the actuating shaft 37 in a position to engage and release the latch 107 at the desired predetermined point in the initial opening movement of the circuit interrupting contacts 21. The trip element 111 has an annular hub 113 which engages the actuating shaft 37 and is rigidly secured in adjusted position thereon by a setscrew 115. The tripping element is provided with a projecting portion 117 having an opening therein in which is mounted a spring-pressed plunger 119. The plunger 119 is adapted to engage and trip the latch 107 when the actuating shaft 37 is rotated in a clockwise direction, and is provided with a beveled end so that the plunger is forced back to clear the latch 107 when the actuating shaft 37 is rotated in a counterclockwise direction to return the circuit interrupting contacts to closed position. The pivoted latch 107 is prevented from rotating clockwise beyond its latching position by means of a fixed stop 121 which engages a rearwardly extending projection of the latch.

The latch lever 99, which normally holds the air break switches 79 in open position is constructed as a double arm lever, one arm 123 of which is adjustable angularly with respect to the latch arm 99. The adjustable arm 123 of the latch 99 carries a pin 125 which projects laterally therefrom into the path of movement of the pendulum 105 so as to be engaged at a predetermined point in the swing of the pendulum, depending upon the angular setting of the arm 123 relative to the latch arm 99. The latch arm 99 has a calibrated scale 127 rigidly secured thereto for rotation therewith about the fixed shaft 101, and the adjustable arm 123 is adapted to be secured in set or adjusted angular position with respect to the latch arm 99 by means of a setscrew 129 carried by the adjustable arm 123 adapted to engage suitable notches provided in the face of the scale 127. The time interval provided by the timing device may thus be adjusted by changing the angular position of the arm 123 relative to the latch arm 99 to make the pendulum 105 engage the arm 123 and release the latch 99 earlier or later in its swing. The mass of the pendulum accelerates at a fixed rate until it arrives at the lowest point of its path, and after this, as it again rises, in the opposite direction, the speed of movement thereof is decelerated. The pendulum type timing device has the advantage that it provides a pure time delay which is independent of the operating conditions affecting the circuit breaker. Also by having the pendulum released at the beginning of the opening movement of the circuit interrupting contacts, the time interval between opening and reclosing is made substantially independent of variations in the speed of movement of the circuit interrupting contacts and other operating conditions.

A resetting means is provided for restoring the circuit breaker or short circuit extinguisher to the initial position shown in Fig. 1 after the circuit breaker has interrupted and reclosed the circuit. This resetting means comprises an air pressure operated piston 131 movable in a cylinder 133 for returning the movable contact members 21 of the circuit interrupters to closed circuit position, a second air pressure operated piston 135 movable in a cylinder 137 for returning the switch blades 81 to open position, and an air pressure operated piston 139 movable in a cylinder 141 for resetting the timing device 103 to latched position.

The piston 131 is connected to the bar 51 which is, in turn, connected by the crank 53 to the actuating shaft 37, so that movement of the piston 131 to the left-hand end of the cylinder rotates the shaft 37 in a counterclockwise direction and thus returns the movable contact members 21 to closed circuit position in which they are latched by means of the latch 47.

The air pressure operated piston 135 for resetting the switch blades 81 to open position is connected to the switch operating shaft 91 by means of a link 143 and a crank arm 145 so that movement of the piston 135 to the left-hand end of its cylinder rotates the switch actuating shaft 91 in a clockwise direction to effect opening of the switches and resetting of the latch 99.

The piston 139 for resetting the timing device is connected by rack 144 and pinion 146 to a resetting member 147 which is rotatably mounted on the fixed shaft 101. The resetting member 147 is provided with a lateral projection 149 which is normally disposed beyond the maximum limit of swing of the pendulum 105 but which is moved by operation of the piston 139 to return the pendulum to latched position. A spring 151 biases the piston 139 and consequently the resetting member 147 to an inoperative position.

Air under pressure from a compressed air supply line 152 is adapted to be admitted to one end of the cylinders 133, 137 and 141 by means of electromagnetically controlled valves 153 and 155, the valve 153 controlling the supply of compressed air to the piston 131, and the valve 155 controlling the supply of compressed air to the cylinders 137 and 141. The valves 153 and 155 are normally biased by springs to connect the cylinders to the outside air, and are adapted to be operated by their controlling electromagnets when energized to admit air under pressure to the cylinders.

The operating windings 157 and 159 of the valves 153 and 155 are adapted to be energized from the supply lines 161 and 163 which are connected to a source of electrical energy (not shown). A circuit 165 connects the operating winding 157 of the valve 153 to the supply lines 161 and 163, and included in series in this circuit is a manual control switch 167. A second circuit 169 electrically connects the operating winding 159 of the valve 155 to the supply lines 161 and 163, and included in series in the circuit 169 is a normally open interlock switch 171 which is closed by the piston 131 when the piston has operated the circuit interrupting contacts 21 to closed position. A second normally closed interlock switch 173 is included in series in the energizing circuit 169, and this switch is adapted to be opened to deenergize the winding 159 after the air break switches 79 have been reset to the open position.

A modified construction of the timing pendulum is shown in Fig. 6. In this modification the pendulum is subdivided into a plurality of masses M1 and M2 mounted on individual arms H1 and H2 which are rigidly connected with each other and disposed at an angle to each other. The two masses M1 and M2 are the equivalent of a single larger mass M mounted on an arm H of greater length as indicated by the dotted lines in Fig. 6. This modified pendulum construction thus provides the equivalent of a larger pendulum on a longer arm and yet requires only a relatively small amount of space. The other parts of the timing device and their relation to the parts of the circuit breaker are the same as for the embodiment shown in Figs. 1 and 3.

The operation of the apparatus is briefly as follows: Starting with the parts in the normal position shown in Fig. 1, let it be assumed that a short circuit occurs in circuit of one of the poles of the circuit breaker. The electromagnetic trip device 57 of the affected pole will be energized a sufficient amount to operate the trip bar 55 and thus effect release of the actuating shaft 37 at the latch 47. Upon release of the actuating shaft 37 the accelerating springs 45 rotate the actuating shaft 37 in a clockwise direction effecting simultaneous movement of the three movable contact members 21 to the open circuit position and opening of the auxiliary switches 61 after the moving contacts 21 have opened a predetermined distance.

At a predetermined point in the initial opening movement of the circuit interrupting contacts 21, preferably at a point shortly after the contacts 21 separate from the fixed contacts 15, the tripping element 111 effects release of the pendulum latch 107 allowing the pendulum to start a swinging movement. At a predetermined point in the swinging movement of the pendulum, determined by the setting of the adjustable arm 123, the pendulum 105 strikes the arm 123 and effects release of the switch controlling latch 99. Upon release of the latch 99 the switch operating springs 97 rotate the switch actuating shaft 91 in a counterclockwise direction effecting simultaneous closing of the air break switches 79. Thus the circuit is interrupted by the circuit interrupting contacts and automatically reclosed a predetermined time interval thereafter by the air break switches 79. The position of the parts after the circuit breaker has opened and reclosed the circuit is illustrated in Fig. 2. As a very high percentage of short circuits are air short circuits which may be cleared in most instances by interruption of the circuit and allowing a short time for deionization at the fault position, the circuit may be immediately reclosed thereafter without causing restriking of the short circuit. Hence the circuit breaker of the present invention is particularly adapted for the clearing of such fault conditions by interrupting the circuit and automatically reclosing the circuit a predetermined interval of time following interruption of the circuit.

To reset the circuit breaker to its initial position following an operation thereof, the operator closes the manual control switch 167. Closing of the switch 167 effects energization of the operating winding 157 and opening of the valve 153 so that air under pressure is admitted to the cylinder 133. The air pressure moves the piston 131 to the left-hand end of the cylinder effecting return of the movable contact members 21 to closed position in which they are held by the latch 47. As soon as the piston 131 reaches the end of its operating stroke the interlock switch 171 is closed, thereby completing the energizing circuit 169 for the operating winding 159 of the valve 155. Operation of the valve 155 admits air under pressure to the cylinders 137 and 141. The piston 135 in the cylinder 137 is operated to the left-hand end of the cylinder and causes clockwise rotation of the switch actuating shaft 91 effecting simultaneous opening of the three switch blades 81, in which position they are held by the latch 99. At the same time operation of the piston 139 in the cylinder 141 effects return of the pendulum 105 to its normal latched position in which it is held by the latch 107. As soon as the switch actuating piston 135 reaches the end of its movement a rod connected thereto engages and opens the interlock switch 173 thereby effecting deenergization of the valve operating winding 159. When the operating windings 157 and 159 of the valves are deenergized, the valves are returned by springs to their normal position in which the cylinders 133, 137 and 141 are all connected to the outside air. A spring 176 returns the resetting member 147 for the pendulum to inoperative position.

A manually operated latch 177 is pivotally mounted on an insulating support 179 secured to the top of the housing 9. The latch 177 is adapted to be moved into latching engagement with one of the switch blades 81 if it is desired to permanently disconnect the circuit breaker from the circuit. When the manually operated latch 177 is moved into latching engagement with one of the switch blades 81, it prevents closing of the three air break switches 79 thus maintaining the circuit breaker in open or disconnected position following an opening operation thereof. The three tripping solenoids 57 may be of the shunt trip type operated either in response to a short circuit condition, or by the operation of a manual trip control switch 175 which, when manually closed, completes an energizing circuit from the supply lines 161—163 for one of the tripping solenoids 57. If it is desired to permanently open or disconnect the circuit breaker the manually operated latch 177 is moved into latching position in engagement with one of the switch blades 81, and the trip control switch 175 is depressed. This causes the circuit breaker to open the circuit in the manner previously described, and the air break switches 79 remain held in open position so that the breaker remains open.

A modification of the invention is shown in Fig. 4. In this modification the construction of the circuit breaker is identical to that shown in Figs. 1 and 2 except that the auxiliary switches 61 are omitted, and the stationary contacts of the air break switches are mounted on the heads of the circuit interrupting devices instead of on a separate fixed support. The same reference characters with prime marks have been used to designate the elements which correspond to those shown in Figs. 1 and 2. In this modification the stationary jaw contacts 83' of the air break switches 79' are mounted directly on the metal heads of the circuit interrupting devices and are thus electrically connected to the upper terminal of the circuit breaker and hence to the lines 77 which is connected to the heads 19. The jaw contacts 83' are insulated from the lower terminal 13' of the circuit breaker by the tubular insulating casings 17'. This construction possesses the advantage that it may be mounted in a shorter vertical space than the circuit breaker construction shown in Figs. 1 and 2. The operation of this embodiment of the invention is identical to that of the embodiment shown in Figs. 1 and 2 except, of course, that the auxiliary switches are not present.

While the invention has been disclosed in accordance with the patent statues, it is to be understood that various changes in the structural details thereof may be made without departing from some of the essential features of the invention. It is desired therefore that the appended claims be given the broadest reasonable construction permitted by their language and the prior art.

We claim as our invention:

1. Electrical switching apparatus for controlling a circuit, comprising a circuit interrupter having circuit interrupting contacts actuating means therefor and means for extinguishing arcs drawn by said contacts, a second pair of contacts structurally associated with the interrupter and electrically connected in shunt relation directly across said circuit interrupting contacts, separate actuating means for said second pair of contacts, said circuit interrupting contacts being normally closed and said second pair of contacts normally open, means operable to cause opening of said circuit interrupting contacts, and means including a timing device for initiating closing operation of said second pair of contacts a predetermined time interval after opening of said circuit interrupting contacts, said timing device providing a predetermined time interval which is substantially constant and substantially unaffected by variations in the speed of movement of said circuit interrupting contacts and other operating conditions.

2. Electrical switching apparatus for controlling a circuit, comprising a circuit interrupter having relatively movable contacts, arc extinguishing means associated with said contacts and actuating means for said contacts, a second pair of relatively movable contacts structurally associated with said interrupter and electrically connected in shunt relation directly across said circuit interrupter contacts, separate actuating means for said second pair of contacts, said circuit interrupting contacts being normally held closed and said second pair of contacts being normally open, means operable upon the occurrence of predetermined conditions for causing opening of said circuit interrupting contacts, and means including a timing device set in operation at a predetermined point in the opening movement of said circuit interrupting contacts and operating independently of the movement of the movable interrupter contact for initiating circuit closing operation of the actuating means for said second pair of contacts a predetermined time interval after said circuit interrupting contacts have passed said predetermined point in the opening movement thereof.

3. A device for interrupting and automatically reclosing an electrical circuit, comprising a circuit interrupter having circuit interrupting contacts actuating means therefor and means for extinguishing arcs drawn by said circuit interrupting contacts, a second pair of contacts structurally associated with the interrupter and electrically connected in shunt relation directly across said circuit interrupting contacts, separate actuating means for said second pair of contacts, said circuit interrupting contacts being normally closed and said second pair of contacts normally open, means operable in response to predetermined conditions to cause opening of said circuit interrupting contacts, and means including a weight-operated timing device set in operation at a predetermined point in the opening movement of said circuit interrupting contacts for initiating closing operation of said second pair of contacts a predetermined time interval after said interrupting contacts have opened to said predetermined point.

4. Electrical switching apparatus for controlling a circuit, comprising a circuit interrupter having circuit interrupting contacts and actuating means therefor, a second pair of contacts structurally associated with the interrupter and electrically connected in shunt relation directly across said circuit interrupting contacts, separate actuating means for said second pair of contacts, said circuit interrupting contacts being normally closed and said second pair fo contacts being normally open, means operable in response to predetermined conditions for causing opening of said circuit interrupting contacts, and means comprising a pendulum released at a predetermined point in the opening movement of said circuit interrupting contacts for initiating closing operation of said second pair of contacts a predetermined time interval after said circuit interrupting contacts have opened to said predetermined point.

5. Electrical switching apparatus for controlling a circuit, comprising a pair of circuit interrupting contacts, actuating means therefor, means for extinguishing arcs drawn by said contacts, a second pair of contacts connected in series with said circuit interrupting contacts for providing a safe air gap when open, a third pair of contacts electrically connected in shunt relation directly across the interrupting contacts and the second pair of contacts, separate actuating means for said third pair of contacts, said circuit interrupting contacts and said second pair of contacts being normally closed and said third pair of contacts being normally open, means operable in response to predetermined conditions for causing opening of said circuit interrupting contacts, and means operable to cause closing of said third pair of contacts a predetermined time interval after opening of said circuit interrupting contacts.

6. Electrical switching apparatus for controlling a circuit, comprising a pair of circuit interrupting contacts, actuating means therefor, means for extinguishing arcs drawn by said contacts, a second pair of contacts connected in series with said circuit interrupting contacts, for providing a safe air gap when open, said second pair of contacts being coupled to said actuating means to be opened after said circuit interrupting contacts open and closed after said circuit interrupting contacts close, a third pair of contacts electrically connected in shunt relation directly across the circuit interrupting contacts and the second pair of contacts, separate actuating means for said third pair of contacts, said circuit interrupting contacts and said second pair of contacts being normally closed and said third pair of contacts being normally open, means operable in response to predetermined conditions to cause opening of said circuit interrupting contacts and opening of said second pair of contacts in rapid succession, and means including a timing device operable to cause closing of said third pair of contacts a predetermined time interval after opening of said circuit interrupting contacts.

7. Electrical switching apparatus for controlling a circuit, comprising relatively movable circuit interrupting contacts, actuating means therefor, a second pair of relatively movable contacts electrically connected in shunt relation direcly across said circuit interrupting contacts, separate actuating means for said second pair of contacts, said circuit interrupting contacts being normally closed and said second pair of contacts normally open, means operable in response to predetermined conditions for causing opening of said circuit interrupting contacts, and means comprising a timing device set in operation after said circuit interrupting contacts have opened a predetermined distance and operating independently of the movement of the movable interrupting contact for initiating closing operation of the actuating means for said second pair of contacts a predetermined interval of time after opening of said circuit interrupting contacts.

8. Electrical switching apparatus for controlling a circuit, comprising relatively movable circuit interrupting contacts, actuating means therefor, a second pair of contacts electrically connected in shunt relation directly across said circuit interrupting contacts, separate spring means for closing said second pair of contacts, said circuit interrupting contacts being normally held closed and said second pair of contacts being normally held open, means operable in response to predetermined conditions for causing opening of said circuit interrupting contacts, and means including a timing device set in operation at a predetermined point in the initial opening movement of said circuit interrupting contacts and operating independently of the movement of the movable interrupting contact for initiating closing of said second pair of contacts a predetermined time interval after said circuit interrupting contacts have passed said predetermined point in the opening movement thereof, and fluid pressure operated means operable to reset said circuit interrupting contacts to closed position while said second pair of contacts are in closed position and thereafter reset said second pair of contacts to open position.

9. Electrical switching apparatus for controlling a circuit, comprising relatively movable circuit interrupting contacts biased to open position, a second pair of relatively movable contacts electrically connected in shunt relation directly across said circuit interrupting contacts, separate spring means for closing said second pair of contacts, said circuit interrupting contacts being normally held closed and said second pair of contacts being normally held open, the movable contact of said second pair of contacts being mounted for movement independently of the movable interrupting contact, means operable in response to predetermined conditions for causing opening of said circuit interrupting contacts, means comprising a pendulum held in raised position by a latch and released at a predetermined point in the opening movement of said circuit interrupting contacts after the movable interrupting contact has moved in opening direction a predetermined amount for releasing said second pair of contacts to cause closing thereof after said pendulum has swung a predetermined amount.

10. Electrical switching apparatus for controlling a circuit, comprising circuit interrupting contacts, actuating means therefor, a second pair of contacts electrically connected in shunt relation directly across said circuit interrupting contacts, a separate spring means for closing said second pair of contacts, said circuit interrupting contacts being normally closed and said second pair of contacts being normally held open, means operable in response to predetermined conditions for causing opening of said circuit interrupting contacts, means comprising a pendulum held in raised position by a latch and released at a predetermined point in the initial opening movement of said circuit interrupting contacts for releasing said second pair of contacts to cause closing thereof when said pendulum has swung a predetermined amount, and adjusting means for adjusting the point in the swing of said pendulum at which it effects release of said second pair of contacts to thereby vary the time interval between opening and reclosing of the circuit.

11. Electrical switching apparatus for controlling a circuit, comprising circuit interrupting contacts, actuating means therefor, a second pair of contacts electrically connected in shunt relation directly across said circuit interrupting contacts, separate actuating means for said second pair of contacts, said circuit interrupting contacts being normally closed and said second pair of contacts normally held open, means operable in response to predetermined conditions to cause opening of said circuit interrupting contacts, means including a pendulum held in raised position by a latch and released at a predetermined point in the opening movement of said circuit interrupting contacts operable to cause closing operation of said second pair of contacts a predetermined time interval after opening of said circuit interrupting contacts, said pendulum comprising a plurality of masses mounted on lever arms which are at an angle to each other and rigidly connected to each other.

12. Electrical switching apparatus for controlling a circuit, comprising a hollow base, a circuit interrupter having relatively movable contacts mounted in an enclosing casing on said base, an air break switch on said base at the side of said circuit interrupter casing and electrically connected in shunt relation directly across the contacts of the interrupter, actuating means for said circuit interrupter mounted in said hollow base, separate actuating means for said switch mounted in said hollow base, said circuit interrupter contacts being normally closed and said switch being normally open, the movable contact of said switch being mounted for movement independently of the movable interrupter contact, means operable in response to predetermined conditions to cause opening of said circuit interrupter contacts, and means including a timing device mounted in said hollow base set in operation at a predetermined point in the opening movement of said circuit interrupter contacts and operating independently of the movable interrupter contact for initiating closing operation of said switch a predetermined time interval after opening of said circuit interrupter contacts.

13. Electrical switching apparatus for controlling a circuit, comprising a hollow base, a circuit interrupter having relatively movable contacts mounted in an enclosing casing on said base and insulated therefrom, an air break switch insulatively mounted on said base at the side of said interrupter casing and electrically connected in shunt relation directly across the contacts of the interrupter, actuating means for said interrupter mounted in said hollow base and connected to said interrupter contacts by an insulating rod, separate actuating means for said switch mounted in said hollow base and connected to said switch by an insulating rod, means operable in response to predetermined conditions to cause opening of said interrupter contacts, and means including a falling weight mounted in said hollow base held in raised position by a latch and released at a predetermined point in the opening movement of said circuit interrupter contacts to cause closing operation of said switch a predetermined time interval after opening of said interrupter contacts.

14. Electrical switching apparatus for controlling a circuit, comprising a hollow base, a circuit interrupter having relatively movable contacts mounted in an enclosing casing on said base, said enclosing casing having an insulating portion and a metal flange, an air break switch electrically connected in shunt relation directly across the contacts of the interrupter and having its movable contact pivoted on the metal flange of the circuit interrupter casing, actuating means for said interrupter disposed in said hollow base, separate actuating means for said switch disposed in said hollow base, said circuit interrupter contacts being normally closed and said switch normally open, means operable to cause opening of said circuit interrupter contacts, and means operated a predetermined point in the opening movement of said circuit interrupter contacts for causing a closing operation of said switch a predetermined time interval after opening of said circuit interrupter contacts.

15. Electrical switching apparatus for controlling a circuit, comprising a base, a circuit interrupter having a stationary and a movable contact mounted in an enclosing insulating casing on said base, said casing having a metal portion adjacent the lower end electrically connected to the stationary contact, an air break switch electrically connected in shunt relation directly across the circuit interrupter contacts, said switch having the movable contact thereof pivoted to the metal portion adjacent the lower end of said circuit interrupter casing at the side of said casing and having its stationary contact secured to the casing adjacent the upper end thereof, actuating means for said circuit interrupter, separate actuating means for said switch, said circuit interrupter contacts being normally closed and said switch being normally open, means operable in response to predetermined condition to cause an opening operation of said circuit interrupter contacts, and means operable to cause a closing operation of said switch a predetermined time interval after said circuit interrupting contacts have opened a predetermined amount.

16. Electrical switching apparatus for controlling a circuit, comprising means for opening and closing the circuit, means operable in response to predetermined conditions to cause a circuit opening operation of said means for opening the circuit and timing means comprising a weight normally held in raised position and released at a predetermined intermediate point in the circuit opening operation for causing a closing operation of the means for closing the circuit a predetermined time interval after opening of the circuit.

17. Electrical switching apparatus for controlling a circuit, comprising means for opening and closing the circuit, operating means therefor, means operable in response to predetermined conditions to cause said means for opening the circuit to interrupt the circuit, and timing means comprising a pendulum normally held in raised position by a latch and released at a predetermined intermediate point in the circuit opening operation for causing the means for closing the circuit to automatically close the circuit a predetermined time interval after opening of the circuit, and adjusting means for varying the time interval provided by said timing means.

18. Electrical switching apparatus for controlling a circuit, comprising a first set of relatively movable contacts for interrupting the circuit, a second set of relatively movable contacts electrically connected in shunt relation directly across said first set of contacts, operating means operable to cause opening of said first set of contacts to interrupt the circuit and to then cause closing of said second set of contacts to reclose the circuit, and timing means set in operation when said first set of contacts have opened a predetermined amount and operating independently of the movement of the movable contact of said first set of contacts to provide a predetermined pure time delay independent of variations in operating conditions between a predetermined point in the opening operation of said first set of contacts and the initiation of the closing operation of said second set of contacts.

19. Electrical switching apparatus for controlling a circuit comprising a circuit interrupter having relatively movable contacts and arc extinguishing means, actuating means for said interrupter, a second pair of relatively movable contacts structurally associated with the interrupter and electrically connected in shunt relation directly across the contacts of the interrupter, the movable contact of said second pair of contacts being mounted for movement independently of the movable contact of the interrupter and being normally maintained in open position, separate actuating means for said second pair of contacts, means operable in response to predetermined abnormal conditions for causing opening operation of said interrupter, and means including a timing device set in operation during the initial opening movement of said interrupter contacts and operable after a predetermined time interval to initiate circuit closing operation of the actuating means of said second pair of contacts to close said second pair of contacts, said timing device operating independently of the movement of the movable interrupter contact.

20. Electrical switching apparatus for controlling a circuit, comprising a circuit interrupter having relatively movable contacts, actuating means therefor, a second pair of relatively movable contacts structurally associated with the interrupter and electrically connected in shunt relation directly across said circuit interrupter contacts, a separate spring means for closing said second pair of contacts, said circuit interrupting contacts being normally closed and said second pair of contacts being normally held open, the movable contact of said second pair of contacts being mounted for movement independently of the movable circuit interrupter contact, means operable in response to predetermined conditions for causing opening of said circuit interrupter contacts, and means including a timing device set in operation at a predetermined point in the initial opening movement of said circuit interrupter contacts and operating independently of the movement of the movable interrupter contact to release said second pair of contacts to cause closing thereof a predetermined time interval after opening of said interrupter contacts.

21. Electrical switching apparatus for controlling a circuit, comprising relatively movable circuit interrupter contacts, actuating means therefor, a second pair of relatively movable contacts electrically connected in shunt relation directly across said circuit interrupting contacts, separate actuating means for said second pair of contacts, said circuit interrupting contacts being normally closed and said second pair of contacts being normally open, the movable contact of said second pair of contacts being mounted for movement independently of the movable interrupting contact, means operable in response to predetermined conditions to cause opening of said circuit interrupting contacts, and means including a timing device set in operation after the movable interrupting contact has moved a predetermined amount in opening direction and operating independently of the movement of the movable interrupter contact for initiating closing of said second pair of contacts a predetermined time interval after opening of said circuit interrupting contacts, said timing device including means for varying the time interval provided thereby.

WERNER KAUFMANN.
OTTO FLÖGEL.
ADOLF THEWALT.
LEOPOLD FERSCHL.